Patented Nov. 28, 1939

2,181,835

UNITED STATES PATENT OFFICE 2,181,835

THREAD SURFACE COATING COMPOSITION

Charles E. S. Place, Detroit, Mich., assignor to Clare L. Brackett, Detroit, Mich.

No Drawing. Application August 7, 1937, Serial No. 157,978

2 Claims. (Cl. 134—17)

This invention relates to the art of liquid coating compositions, an object being to provide a coating composition for screw threaded elements of metal which, when such elements are engaged in service attachment with complemental threaded members, inhibits thread seizure therebetween and serves also as a sealing medium preventing the passage of fluid, particularly liquids, between and along the threaded contacting surfaces.

Another object is to provide a coating composition for metal surfaces containing a flocculent coating material whose character remains unchanged when subjected to extremely high temperatures, dispersed in the liquid phase in a colloidal carrier capable of providing a coherent film forming body when applied.

Other objects will be apparent from the description to those skilled in the art.

Coating compositions made in accordance with this invention comprise a water organic solvent or oil dispersion of a crystalline or amorphous substance impervious to the effects of high temperatures, with suitable wetting agents therefor, suspended in a colloidal liquid carrier or vehicle which is itself capable of providing a seal against passage of fluids, particularly such liquids as oil and/or water.

A wide variety of substances impervious to the effect of high temperatures may be employed, examples being such materials as graphite, mica, cryolite, and carbon black.

Suitable liquid dispersing media comprise water and/or light drying oils, organic solvents, or their equivalents.

Where the particular heat resistant substance employed is not readily wettable by the liquid dispersing medium used I employ wetting agents, specific examples of such being "Aresklene #375" and "Santomerse."

Suitable colloidal carriers which function as binders to provide a coherent film forming body are casein, glue, starches, dextrin, gums, and latex. It is to be understood that the term latex is here employed in a generic sense and for the purposes of this invention includes rubber in any form, either dispersed raw rubber, synthetic rubber water dispersions, reclaimed rubber, prevulcanized latex compounds, vulcanizable, and non-vulcanizable latex compounds.

In those instances where it is desirable that the film of coating composition shall swell under the action of oil, or water as for sealing purposes, a simple non-vulcanizable latex compound is employed as the carrier.

In some cases it might be desirable to employ a coating composition that is resistant to the action of oil or water, in which case a synthetic or vulcanizable latex compound is employed.

In short, the properties of the latex composition can be varied at will to cope with different conditions.

Although the invention is not restricted to the use of organic carriers, and may make use of inorganic carriers, the organic binders are preferred due to the fact that when subjected to very high temperatures the organic materials decompose and disappear, leaving the contained heat resistant ingredients deposited as an amorphous film on the surface of the metal.

A particular object of this invention is to provide a coating composition capable of covering the surfaces of screw threaded metal parts such as screws, bolts, etc., with a protective coat of finely divided, heat resistant material which can function both as a lubricant and as a protector against oxidization.

A water dispersion of the selected heat resistant material would, naturally, be the most economical material to use, but such could only be prepared by mixing the selected material with water and thoroughly agitating the mixture until a satisfactory dispersion is obtained. Such a method is cumbersome and not altogether satisfactory, inasmuch as complete wetting of the particles of heat resistant material is not obtained.

I have found it advantageous to utilize certain wetting agents as hereinbefore specified to bring about a complete dispersion of the heat resistant substant.

While a dispersion thus produced is capable of use it is not coherent in mass and could readily become dislodged after application. By employing a binder as a carrier the requisite cohesion is obtained and the composition will be retained on the surface to which it is applied.

For purposes of statutory compliance a preferred specific composition is as follows:

A desired quantity of graphite is dispersed in water with a wetting agent such as "Santomerse" or "Aresklene #375" and incorporated in a desired quantity of latex, the proportion of latex dry solids to the graphite being 10% or less, by weight.

Where desired, suitable rust inhibitors may be added to the composition.

A composition made in accordance with this invention, when applied to metal surfaces, particularly to the thread surfaces of screw threaded fastening elements, not only permits such elements to function satisfactorily under high temperature conditions by preventing thread seizure, but also prevents leakage between engaged threaded elements such as would occur in the use of cylinder head cap screws where the cylinder block is porous and thus allows leakage of water from the water jacket into the tapped holes receiving the cap screws.

The composition has also been found efficacious as a lubricant coating for engaged metal surfaces, particularly for the leaves of springs and the like.

While I have described certain specific materials forming the composition it is to be understood that any suitable equivalent materials may be employed and in any desired proportions within the scope of the invention as claimed.

Having thus described the invention, what is claimed is:

1. A liquid composition for coating the thread surfaces of metal screw threaded fastening elements, consisting of a water dispersion of wetted graphite in latex in the proportions of 10% or less of latex dry solids to graphite, by weight.

2. A liquid composition for coating the thread surfaces of metal screw threaded fastening elements, consisting of a water dispersion of a pulverulent inorganic lubricating material resistant to high temperatures in latex, in which the latex dry solids are 10% or less of the inorganic material, by weight.

CHARLES E. S. PLACE.